United States Patent [19]
Ormont

[11] 3,782,776
[45] Jan. 1, 1974

[54] CONVERTIBLE ROOF FOR A STATION WAGON

[76] Inventor: Louis Ormont, 115 Central Park West, New York, N.Y.

[22] Filed: Nov. 1, 1971

[21] Appl. No.: 194,287

[52] U.S. Cl............................................ 296/137 B
[51] Int. Cl............................................... B60j 7/10
[58] Field of Search.................. 296/137 B, 100, 26; 49/367, 368, 369

[56] References Cited
UNITED STATES PATENTS

| | | | |
|---|---|---|---|
| 3,400,968 | 9/1968 | Smith | 296/137 B |
| 1,919,328 | 7/1933 | Hansen | 49/367 |
| 3,069,199 | 12/1962 | Reardon | 296/100 |

Primary Examiner—Robert R. Song
Attorney—Roland Plottel et al.

[57] ABSTRACT

A convertible roof for a station wagon having a pair of roof members oriented along the length of the wagon. Each of said members is pivotally mounted along one of their sides to opposite side walls of the wagon. Seal means are provided along the mating edges of each of said members for holding them together in a watertight fit. The seal means in one embodiment include tongues along their common edge which fit together in overlaping relationship. Brace means are provided for supporting the roof members when they are pivoted to an open position.

7 Claims, 6 Drawing Figures

PATENTED JAN 1 1974

INVENTOR.
LOUIS R. ORMONT

BY Roland Plottel

ATTORNEY

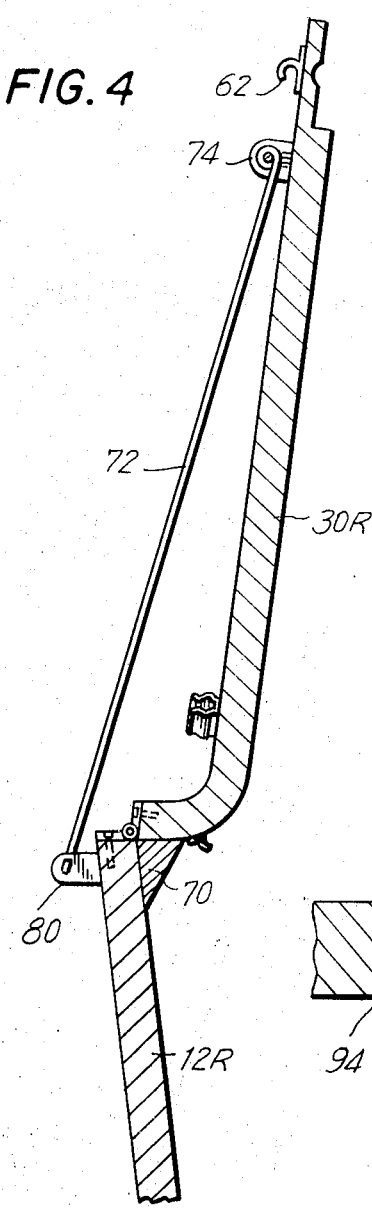
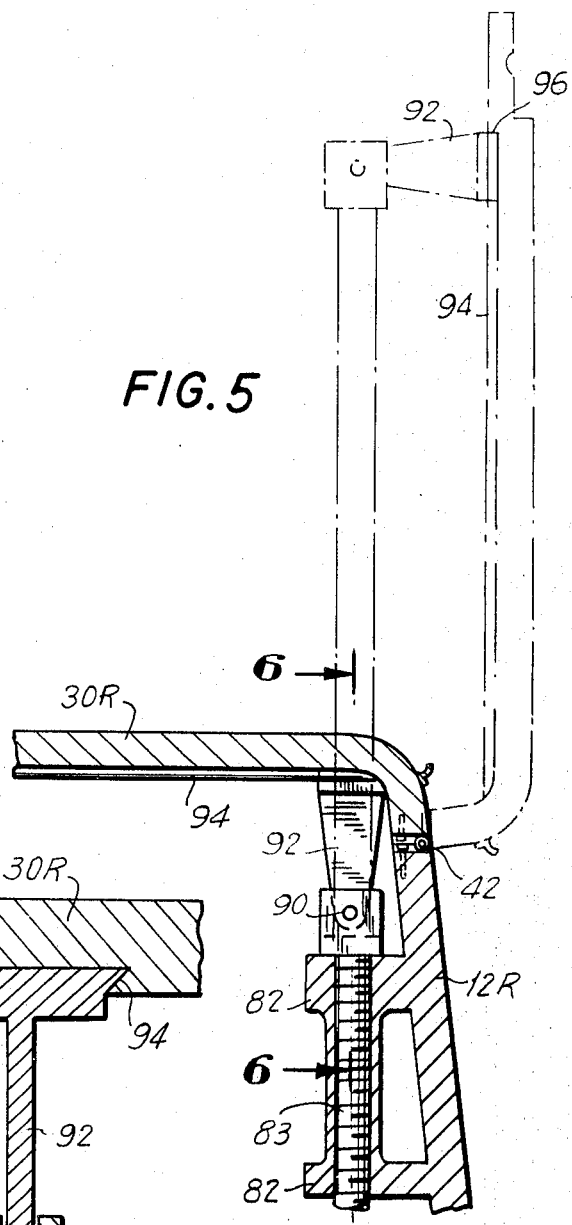
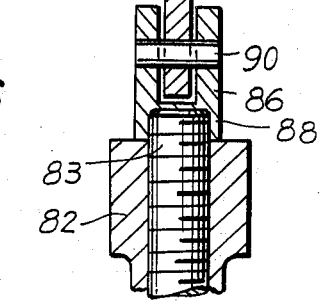

CONVERTIBLE ROOF FOR A STATION WAGON

The invention relates generally to motorized vehicles, and more particularly to station wagons.

The station wagon model of automobile is widely owned by individuals and home owners where it is used as a family or residential vehicle. A family chooses a station wagon rather than a sedan, because of its additional carrying space. The large open space at the back of the station wagon may be used by a housewife for her groceries, by the husband for hauling garden supplies and lumber for repairs. When the family goes on vacation, the station wagon affords additional space in which to put luggage or camping equipment.

The ownership of the station wagon model over a sedan is often dictated by the considerations of additional "trunk" space. While most families do not often need, or use, this additional trunk space of the station wagon, there are several times every year when a family requires this additional space. The occasional need for additional carrying capacity prompts many families to purchase the wagon, rather than a sedan and then rent a small truck or trailer, or engage the services of a light mover when it is necessary to move a large load. Thus, the traditional station wagon is an acceptable vehicle for family use, while at the same time providing the additional carrying capacity that is required several times during the year by a normal household.

Over the years, many improvements have been made in station wagon design which have facilitated the loading and unloading of the wagon. For example, recently a rear door has been introduced that both pivots vertically on the side of the wagon, as well as horizontally as in the traditional station wagon with the drop tail-gate. Another innovation has been the tail-gate hinged at the top of the wagon, which opens upward rather than down. The advantage here is that it is easier to load the wagon in rainy weather, and that it is not necessary to climb over the tail-gate in order to reach into the rear of the wagon.

However, with all these improvements, in station wagon design, there are still many objects which do not fit, or which are very difficult to fit into the family station wagon. For example, a chest of drawers invariably has to be laid down before being put into the wagon, because generally the roof is too low to permit the chest to stand upright. If two chests of drawers are to be transported, one must be laid on top of the other, or they must be taken singly one at a time. Large size beds and bed frames, do not fit into the standard station wagon, and must be either strapped onto the top of the wagon, or a carry-all trailer or small truck must be rented to transport them. Furthermore, when there is a large household load to be carried such as for a camping vacation, the roof of the wagon is just slightly too low to accommodate all of the equipment. And once the back of the wagon is filled, it is necessary to put additional items on the middle seat or to strap them onto the roof of the wagon. Thus, there are several occasions in the course of each year in which the station wagon owner finds that his wagon is just not large enough to carry the chest of drawers, bed, camping equipment, or other item that he has to transport. Thus, the wagon owner is left on these occasions without the advantages of the "trunk" capacity of the wagon that he had originally hoped would be available from the vehicle. And as a practical matter, he must search for means other than his family station wagon for transporting his goods.

The present invention provides a novel station wagon openable roof assembly, which avoids these shortcomings of conventional station wagons. Every man can thus become his own mover.

The invention contemplates in one embodiment a vehicle with a station wagon type body. That portion of the roof of the wagon, for example extending from just behind the driver's or front seat, to the rear of the wagon, is made of two openable portions. Typically, the two openable roof members extend along the length of the wagon and are hinged to the side walls of the wagon. The openable roof portions, when necessary, are swung out and open, thereby leaving that portion of the station wagon from just behind the front or driver's seat to the rear of the wagon entirely opened. In normal every day use, the roof members of the wagon are kept down, or in closed position. However, on those occasions when it is necessary to put a very large object in the station wagon, or to increase its carrying volume, the roof members would be swung open on their hinges so as to provide additional space. The additional space would only be limited by how high an object could be carried in the open roofed wagon.

The feature of being able to open the top of the wagon has an additional advantage, namely that of facilitating the loading and unloading of the wagon. In normal use, the baggage entered into the back of a wagon is just pushed in over the tail-gate. However, there are certain circumstances when the items being carried have to be carefully positioned within the wagon. The person doing the loading has to spend some time in the rear of the wagon. Where such loading or unloading is necessary, it is possible with the wagon of this invention to first drop the tail-gate of the wagon, and then open the roof of the wagon. Thereby, a person may mount on the tail-gate and walk into the back of the wagon to do whatever loading or unloading is necessary, without having to constantly crouch, crawl and bend inside the rear portion of the wagon, as was previously necessary in the conventional wagon.

It will be appreciated that the feature of being able to open the rear top of the wagon will also facilitate cleaning of the inside of the wagon, in that when cleaning the wagon it is possible to stand erect, and it is not necessary to crouch in an awkward position.

When the roof members of the wagon are in the closed position, it is imperative that the roof be completely weather-proof, i.e., not admit any water due to rain or melting snow and ice. The joint of the roof members must be weather-tight not only at their common interface, but also be weather-tight at their hinged edges where they join the sides of the car, as well as at their front and rear portions where they join the front fixed roof and the rear roof or tail-gate top. The present invention includes means for providing such a water-tight seal.

The convertible wagon-top may be manually opened and closed. In one embodiment, however, provision is made for automatically raising and lowering the convertible roof. The control of the opening and closing of the convertible top may be either semi-automatic, such as by cranking the roof up and down; or may be completely automatic, such as with an electric driven motor operated by a finger control on the dashboard of the car. The latter control would be similar to the raising and lowering of the rear window in a station wagon having an automatic rear window.

A station wagon constructed in accordance with the invention will be operated a good deal of the time with the top down, or with the convertible roof in the closed position. It is, therefore, important that the roof not only be sealed against wet weather, but also be mechanically strong enough so as to prevent unnecessary rattling and shaking. In one embodiment of the invention, there is shown a means for providing a mechanically tight fitting of the roof elements together.

It is an object of the present invention to provide a station wagon which can carry oversized and large objects which cannot easily be entered into a conventional fixed roof station wagon.

It is a further object of the present invention to provide a station wagon whose trunk space is expandable so as to carry a large volume of baggage.

It is a further object of the present invention to provide a station wagon which may be opened and closed.

It is still a further object of the present invention to provide a station wagon whose roof may be opened and closed either manually or automatically.

It is a further object of the present invention to provide a station wagon with a convertible roof and in which the roof is weather-tight or dry when the roof is in a closed position.

According to the invention there is provided a convertible roof for a station wagon having a pair of roof members oriented along the length of the wagon with each of said members being pivotally mounted along one of their sides to opposite side walls of the wagon. The roof members have seal means along the opposite side of each of said members for holding the roof members together with a water-tight fit when said members are in a closed position, and brace means for supporting said roof members when pivoted to an opened position.

The construction of illustrative embodiments as well as further objects and advantages thereof, will become apparent when read in conjunction with the accompanying drawings, wherein:

FIG. 4 is a view of the roof member of FIG. 3 shown in the open position.

FIG. 5 is a partial sectional veiw of a roof member and illustrating an alternative embodiment of the invention.

FIG. 6 is a view of the support member of FIG. 4 taken along lines 6—6 of FIG. 5.

Figure 1:
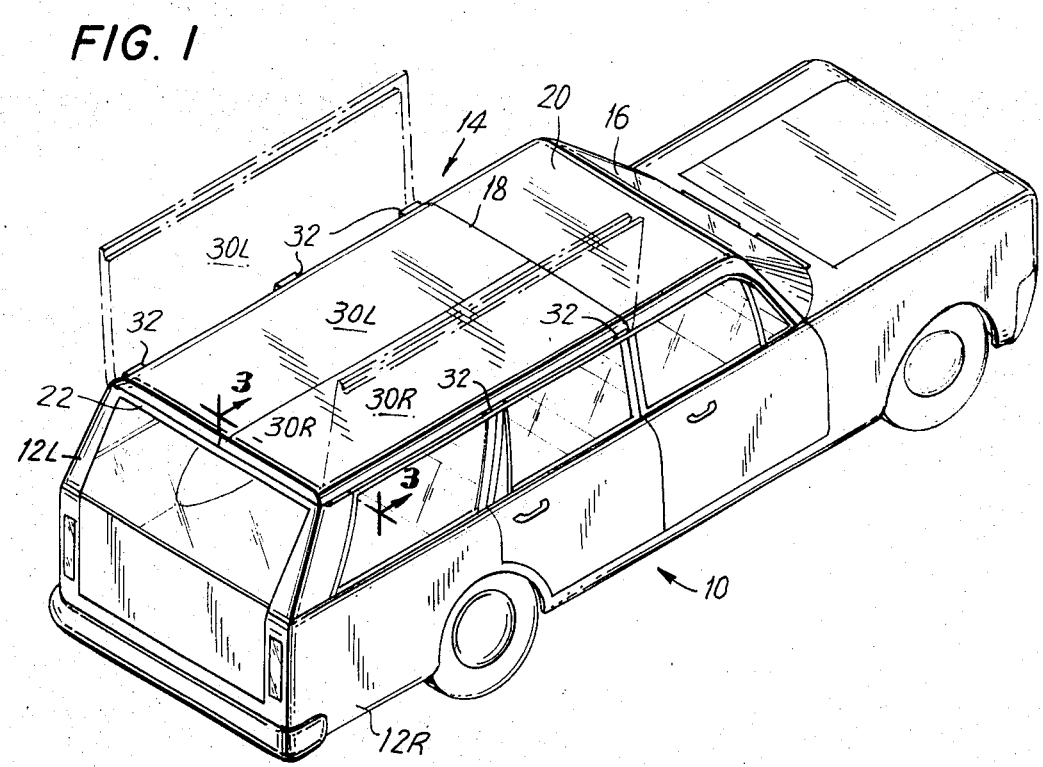
FIG. 1 is a perspective view of a station wagon having the convertible roof of this invention, and showing in phantom the roof in an opened position.

Referring now to FIG. 1, there is shown a perspective view of a station wagon 10. The wagon has a right side 12R and a left side 2L, and a roof shown generally as 14. The forward part of the roof extending from the front windshield 16 backwards to a position 18 approximately just behind the front or driver's seat, is a roof portion 20 whose outer surface is continuous with the body of the automobile. The remainder of the wagon top extending rearward from the front portion of the roof 18 to the back end 22 of the station wagon is divided into two sections, 30R and 30L. These two sections 30R and 30L, are hinged to the sides of the main body of the car 12R and 12L respectively. The roof sections 30R and 30L are shown in FIG. 1 in both their down or closed position, and in phantom, in their hinged up position.

Figure 2:
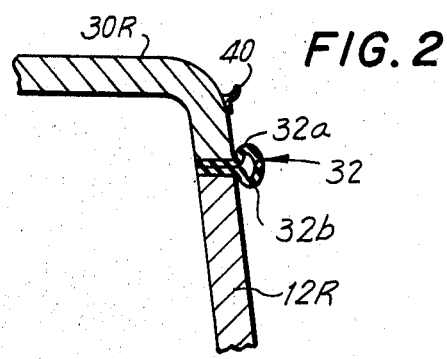
FIG. 2 is a section view of a hinge member shown in FIG. 1.

Three hinges 32 are provided for each section 30R and 30L. Each hinge 32 has a large heavy duty covered weather-proof clamp-type hinge which is shown in cross-sectional detail in FIG. 2. Clamp 32 is of the kind that permits the roof sections 30R and 30L to open approximately 90°. At this point, the C shaped jaw of the clamp 32a will rest against the C shaped jaw 32b of the lower portion of the clamp and thereby prevent the roof from opening further. The hinges 32 are mounted in a recess on the inside of the roof portions 30 and the side walls 12 such that the two edge portions of the roofs 30 and the side walls 12 are tight along their entire length. To insure dryness at this joint, a gasket may be inserted down the length of the edges of the roof portion 30, and the side walls 12.

A run off track 40 is located above the hinges 32 on the roof section. Thus, water from the roof is caught by the gutter or run off track 40 and tends to thereby reduce the amount of water in the hinge and joint area of the convertible roof.

Figure 3:
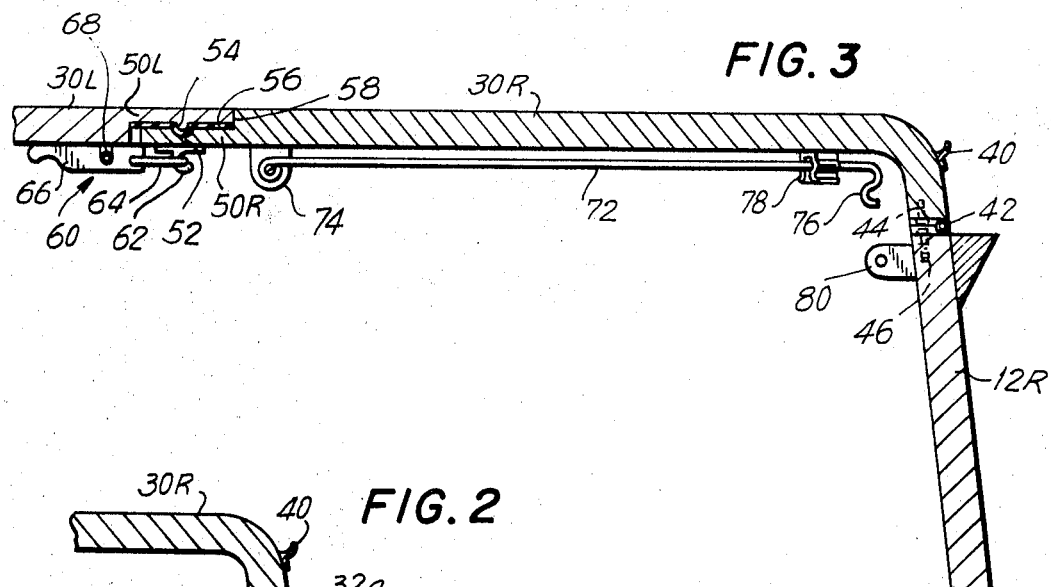
FIG. 3 is a sectional view taken through a portion of one roof member along the lines 3—3 as shown in FIG. 1.

FIG. 3 is a cross-sectional view taken along lines 3—3 of FIG. 1 showing a portion of the roof section 30L, 30R, and the right side 12R. The hinge arrangement here 42 is slightly different than the hinge arrangement 32 shown in FIG. 2. Hinge 42 is a concealed hinge and is shown attached to the roof 30R by bolts 44 and attached to the side wall 12R by bolts 46. A weather stripping, or gasket (not shown) may be provided in the crack where the roof section 30R joins the side wall 12R. As in the case of FIG. 2, the rain gutter or run off water track 40 is provided on the roof section above the hinge 42.

At the junction of the right and left roof sections 30R and 30L, there is provided a weatherproof seal. The left section 30L is shown having a tongue 50L which overlaps a corresponding tongue 50R of the right roof section 30R. A channel 52 is provided within the tongue 50R of the right roof section and extends along its length. A protruding member 54 extends outwardly from the tongue 50L of the left roof section, and mates with the channel 52. A gasket, or weather strip seal, 56, is positioned on the upper face of the right most tongue 50L to provide a tight seal and avoid water seepage. The gasket 56 is shown here only on the horizontal plane between the upper and lower tongues 50L and 50R. However, the gasket 56 may be extended into the vertical cracks at the vertical edges of the tongues 50L and 50R. The area of overlap of the tongues 50L and 50R is typically a few inches.

The lower tongue 50R is slightly shorter than that of the upper tongue 50L. The purpose of this is to have the right most, or outer most edge of the tongue 50L fit flat against the side of the roof 30R at the position shown in the drawings by legend 58. With the upper member 50L slightly longer than the lower member 50R, this tight fit is possible. Thus, there is a smooth fit, or simply a crack along the top of the car. If this arrangement is not employed, it is possible that there would be a small space between the right most edge of member 50L and the surface 58 of the right roof section. And this section would tend to collect water and debris.

A snap clamp 60 having an eye 62 on the right roof member and a hook and clamp portion 64 and 66 respectively on the left roof member 30L is used to draw the two roof members 30R and 30L together in the horizontal plane. This clamp fastener which is of the resilient type, holds the edge 58 of the right roof member firmly against the right most side of the left roof member at 50L. The clamp also exerts a certain amount of resilient grip in the vertical direction and thus also tends to tighten the seal on the gasket 56. The fastener 60 is opened or released by pulling down on the clamp member 66 at its left end which pivots about a point 68 to release the hoop 64 from the eye member 62.

A similar weather-proof seal is provided between the front roof portion 20 and the openable roof sections 30R and 30L. The front edge of the right and left roof sections are provided with lip sections or flanges which overhang an underlying lip or flange on the rear portion of the roof section 20. A channel and mating groove are provided upon opposite mating faces of the lip areas. A gasket or weather seal is also provided in this mating region. Finally, a snap clamp similar to snap clamp 60 may be provided to hold the fixed roof sections 30R and 30L in a tight fit.

The rear edges of the openable roof sections 30R and 30L may fit onto a horizontal roof post 22 on the rear of the wagon. The rear edge of the openable roof sections 30R and 30L as well as the forward edge portion of the post 22 are fitted with matched flanges which have a channel and protruding groove, gaskets, and clamps as at the forward edge of the roof section, and which provide a tight fit between the rear post 22 and the openable roof sections 30. Alternatively, the wagon may be without a rear horizontal member 22 and the back portions of the openable roof 30R and 30L rest upon the top of the rear window, or upon the top of the tail-gate door. The roof members 30R and 30L extend in a protruding fashion rearward beyond the top of the tail-gate door. This overhang directs rain water beyond the back edge of the wagon's rear door and roof and aids in keeping the wagon dry. A gasket may be formed on the inside surface of the roof members 30, where the top of the tail-gate joins the roof in a closed position. A channel is preferably provided for fitting of the top of the tail-gate into the roof when it is in a closed position.

Referring now to FIGS. 3 and 4, there is illustrated the roof member 30R in the closed position in FIG. 3 and in the braced opened position in FIG. 4. When the roof 30 is in the opened position, its lower end rests on a support flange 70 mounted on the side wall 12R of the wagon. Flange 70 provides rigid mechanical support and defines the limit of clockwise most pivotation of roof section 30R. A support brace 72 is shown in FIG. 3 in its inoperative position, and in FIG. 4 in its operative or in use position. The brace 72 holds the roof section 30 in the opened position and prevents it from pivotation in the counter clockwise direction. Thus, when the roof is opened, it is held in the opened position by the flange 70 (which prevents it from moving clockwise) and by the brace 72 which prevents it from moving counter clockwise.

The brace 72 is pivotally mounted at one end on a pivot 74 located near the outer edge of the roof section. Its other end is equipped with a hook 76. When the roof is closed the brace is stored in a not-in-use position, as shown in FIG. 3, and is fastened to the roof by a spring clamp 78. When the brace is in the in-use position, as shown in FIG. 4, the hook 76 is attached to a hook eye, 80, mounted on the side wall 12R. Typically, the hook eye 80 and the flange 70 are of a single piece, or are connected together and thereby provide a good support for the roof section when in the opened position. The hook 76 may be curved in various ways so as to improve its gripping of the hook eye 80. A retaining look of the kind used on ship cables may also be employed on the hook to avoid its slipping out of the eye 80.

In a typical operation of opening the roof sections, the clamps 60 which are along the common edge of the roof sections and the roof section and fixed roof 20 are snapped open, releasing the right and left roof sections from each other, and from the fixed roof. The left section is first lifted out into the up position, and its braces 72 are then attached. (Braces are not shown for the left section in these drawings, but it is understood that there are several braces for the left section as there are for the right section.) The right section is then lifted into the up position and the braces 72 are snapped into position. To close the roof section the right most section is first taken down by removing the hook 76 of the braces 72 from the hook eyes 80 after which the roof section is pivoted counter clockwise to the down position. After this, the same procedure is followed for the left most section and the clamp rings 64 are put into the clamp eye 62. The handles 66 are then snapped shut which pulls the right and left sections together in tight fit.

Referring now to FIGS. 5 and 6, there is shown an alternative embodiment of the invention. In these figures there is shown an automatic means for raising and lowering the roof sections. In FIG. 5, the roof is shown in the down position, and is also shown in phantom in the up or opened position. Besides each hinge 42 and between the window spaces on each side of the station wagon are three hollow steel channels 82. Only one of these channels is shown in the figures, but it is understood that two more are positioned at appropriate intervals along the length of the roof section. Within these channels is a threaded jack member 83 which advances upward or downward in the channels in accordance with its rotation. A motor 84 is shown schematically connected to the threaded member 83, for causing rotation of the threaded member 83. At the upper end of the threaded member below the roof is a joint member 86 which has a cylindrical aperture 88 in its lower end for receiving the upper end of the threaded member 83. The cylindrical section is of such a diameter that the threaded member may turn easily and freely therein. Suitable bearing surfaces, such as a ball bearing (not shown) may be included at the interface. The joint has pivotally mounted in its upper end on a pivot 90 a follower 92. The pivot permits the follower 92 to turn in a direction transverse the length of the automobile. The upper end of the follower 92 fits into a guide track 94 mounted in the roof 30R. This can best be seen in FIG. 6. When the motor is activated, it causes threaded member 83 to rotate. The rotation engages the nut in channel members 82 and causes threaded member 83 to rise. This in turn pushes against the lower portion of the joint at 88 and causes the joint to rise exerting pressure on the follower member 92 which in turn applies pressure to the roof 30R. As the roof begins to rise, pivoting on hinges 40, the follower 92 slips in the guide track 94. As the roof rises, the follower 92 moves from a horizontal position shown in dark lines in FIG. 5 to a vertical position as shown in phantom in FIG. 5. As the roof moves, the follower 92 pivots on the pivot 90 so that when the roof is completely opened the follower 92 is in the horizontal position as shown in phantom in FIG. 5. The guide way 94 terminates at a point 96. (The joint 86 is provided with a stop which prevents the guide 92 from rotating further clockwise than its position shown in FIG. 5.) Thus, the rigid bar of the threaded member 83, in combination with the joint 86 and the follower 92 at the end of the guide way 94 against the stop 96 provides a support for the roof sections when in the opened position.

As an alternative embodiment there may be used in place of the threaded member 83 and motor drive 84, a notched bar with ratchet lever drive. The notched bar would be mounted in channels similar to the channel 82 used for the threaded member, however, the notched bar would be raised and lowered with ratchet lever jacks similar to the kind of jacks used to raise automobiles. When in the raised position, the notched bar of the jacks would serve as a supporting rib to the convertible roof preventing it from collapsing inwards.

If thought desirable and needed, additional support braces may be provided for the roof when it is in the opened position, for example, a bar (not shown) may be attached to the upper outer ends of the roof sections 30R and 30L in the horizontal position when they are in the opened position.

Thus, there has been shown and described a station wagon roof which may be opened or closed at the driver's will. When in the closed position, the roof would be dry and be no different than a conventional station wagon roof, which is permanently closed. When in the opened position, however, the station wagon would be capable of being loaded with tall objects which would not fit into a closed station wagon, or with a larger volume of objects that could be fitted into the closed station wagon. Thus, the carrying or transporting ability of the station wagon is vastly increased. The versatility of the wagon to remain closed and operate as a conventional wagon, or to be opened and carry oversized and larger volume or baggage, would without much difficulty permit the family station wagon to take on those additional transportation chores which heretofore have not been possible with conventional station wagons.

There has been shown and described a station wagon whose roof section may be opened and braced opened and which is based in the opened position for retaining the wagon. There has also been described means for keeping the roof securely closed and to keep out the wetness and to prevent the collection of debris at the joint between the roof sections.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What I claim is:

1. A convertible roof for a station wagon comprising a pair of roof members oriented along the length of the wagon, each of said members being pivotally mounted along one of their sides to opposite side walls of the wagon; seal means along the other side of each of said members for holding, when in a closed horizontal position, said members together in a water tight fit and having overlapping tongues along their common edge; said seal means includes at least two snap clamps for straddeling the common edge and resiliently holding the roof members together and brace means for supporting said roof members when pivoted to an open position.

2. A convertible roof according to claim 1 wherein a water run off track is mounted on the roof members above their pivotal mounting to reduce water in the pivotal region.

3. A convertible roof according to claim 1 wherein the tongues include a mating channel and a protruding member respectively on opposite tongues.

4. A convertible roof according to claim 3 wherein said seal means includes a gasket along the common edge of the two roof members.

5. A convertible roof according to claim 1, wherein the outer tongue is longer than the inner tongue.

6. A convertible roof for a station wagon according to claim 1, wherein said snap clamps are on the inside of said station wagon roof, and said seal means along said common edge of said members is flush with the outside of said station wagon roof when closed.

7. A convertible roof for a station wagon according to claim 1, wherein said common edge of the said roof members includes vertical abutting faces, and said snap clamps exert a larger horizontal force for holding said vertical abutting faces together than the vertical force for holding said overlapping portions of said tongues together.

* * * * *